(12) United States Patent
Sharma et al.

(10) Patent No.: US 12,287,769 B2
(45) Date of Patent: Apr. 29, 2025

(54) SYSTEM, METHOD, AND COMPUTER PROGRAM FOR PLATFORM INDEPENDENT JSON CONFIGURATION BASED REPORTING SERVICES

(71) Applicant: JPMorgan Chase Bank, N.A., New York, NY (US)

(72) Inventors: Desh Sharma, Bengaluru (IN); Sweety Jeswani, Mumbai (IN); Hans P Nirmal, Frisco, TX (US); Sushant Paul, Bengaluru (IN); Sanketh Bhat, Bengaluru (IN)

(73) Assignee: JPMORGAN CHASE BANK, N.A., New York, NY (US)

(*) Notice: Subject to any disclaimer, the term of this patent is extended or adjusted under 35 U.S.C. 154(b) by 38 days.

(21) Appl. No.: 18/208,568

(22) Filed: Jun. 12, 2023

(65) Prior Publication Data

US 2024/0362195 A1 Oct. 31, 2024

(30) Foreign Application Priority Data

Apr. 29, 2023 (IN) .............................. 202311030891

(51) Int. Cl.
*G06F 16/21* (2019.01)
*G06F 16/22* (2019.01)

(52) U.S. Cl.
CPC ........ *G06F 16/217* (2019.01); *G06F 16/2282* (2019.01)

(58) Field of Classification Search
CPC ........................ G06F 16/217; G06F 16/2282
See application file for complete search history.

(56) References Cited

U.S. PATENT DOCUMENTS

| | | | |
|---|---|---|---|
| 11,210,456 B2 * | 12/2021 | Theis | G06Q 40/12 |
| 11,409,943 B1 * | 8/2022 | Chodankar | G06F 40/103 |
| 11,544,241 B1 * | 1/2023 | Sosna | G06F 16/212 |
| 2008/0263440 A1 * | 10/2008 | Kiziltunc | G06F 40/154 |
| | | | 715/239 |
| 2011/0035744 A1 * | 2/2011 | Bhatia | G06F 16/252 |
| | | | 717/174 |

* cited by examiner

*Primary Examiner* — Jared M Bibbee
(74) *Attorney, Agent, or Firm* — GREENBLUM & BERNSTEIN, P.L.C.

(57) ABSTRACT

Various methods, apparatuses/systems, and media for generating platform and database agnostic reports without depending on reporting services are disclosed. A processor receives a configuration file via a user interface, the configuration file including reporting configurations for components associated with reporting service; interprets the configuration file by utilizing corresponding interpreter libraries; invokes, in response to interpreting the configuration file, a predefined application programming interface (API); processes, in response to invoking the API, the reporting configurations using the interpreter libraries to process data object references and pre-configured report layout formats; receives a request from a user to generate a custom report; and automatically renders, in response to receiving the request, a platform and a database agnostic report by implementing a desired visualization techniques.

17 Claims, 9 Drawing Sheets

SYSTEM, METHOD, AND COMPUTER PROGRAM FOR PLATFORM INDEPENDENT JSON CONFIGURATION BASED REPORTING SERVICES

CROSS-REFERENCE TO RELATED APPLICATIONS

This application claims the benefit of priority from Indian Patent Application No. 202311030891, filed Apr. 29, 2023, which is herein incorporated by reference in its entirety.

TECHNICAL FIELD

This disclosure generally relates to data management and report regeneration, and, more particularly, to methods and apparatuses for implementing a platform and database agnostic report generating module configured to generate platform and database agnostic report templates without depending on Structured Query Language Server Reporting Services.

BACKGROUND

The developments described in this section are known to the inventors. However, unless otherwise indicated, it should not be assumed that any of the developments described in this section qualify as prior art merely by virtue of their inclusion in this section, or that these developments are known to a person of ordinary skill in the art.

Today, a wide variety of business functions are commonly supported by software applications and tools, i.e., business intelligence (BI) tools. For instance, software has been directed to data processing, data migration, monitoring, performance analysis, project tracking, data management, and competitive analysis, to name but a few. Typical database server reporting service may be used to prepare and deliver a variety of interactive and printed reports. Such a service may be administered via a web interface. For example, reporting services may include a web services interface to support the development of custom reporting applications. Structured Query Language (SQL) databases are one of the most commonly used data bases. Thus, an example of any reporting services that enables users to create, deploy and manage reports for their organizations, as well as provides programming features that enables users to extend and customize their reporting functionality. Thus, any reporting services may manage components associated with the reporting services features such as data connectors, fetch data processing extension, and/or reporting configurations information. However, with databases having tight coupling with business specific queries, stored procedures, and functions. Thus, whenever application undergoes target database changes, dependency on reporting services may fail to provide programming features that may enable users to extend and customize their reporting functionality in a database agnostic manner thereby failing to provide a platform for adding rich customized features for reporting.

Thus, there is a need for an advanced tool that can remove this conventional dependency on reporting services for report generations.

SUMMARY

The present disclosure, through one or more of its various aspects, embodiments, and/or specific features or sub-components, provides, among other features, various systems, servers, devices, methods, media, programs, and platforms for implementing a platform and database agnostic report generating module configured to generate platform and database agnostic report templates without depending on reporting services, but the disclosure is not limited thereto.

For example, the present disclosure, through one or more of its various aspects, embodiments, and/or specific features or sub-components, provides, among other features, various systems, servers, devices, methods, media, programs, and platforms for implementing a platform and database agnostic report generating module configured to facilitate; generation of platform independent library; generation of database agnostic report templates; adding rich customized features for reporting; implementation of lightweight JavaScript® Object Notation (JSON) based configuration; generation of a platform that supports all report formats; generation of a platform that supports heterogeneous data sources; generation of a user interface that provides better visualization of data, but the disclosure is not limited thereto.

For example, the present disclosure, through one or more of its various aspects, embodiments, and/or specific features or sub-components, provides, among other features, various systems, servers, devices, methods, media, programs, and platforms for implementing a platform and database agnostic report generating module configured to develop a system and implement a method where corresponding application programming interfaces (APIs) are exposed which accepts JSON file containing reporting configurations such as data object reference (i.e., API or database or file, etc., but the disclosure is not limited thereto), report layout formatting (i.e., formatting cell or header or footer or charts or tables or sheets, etc., but the disclosure is not limited thereto).

According to exemplary embodiments, the system and method may process JSON configurations using interpreter libraries to process data objects and report formatting and then render reports using visualization techniques.

According to exemplary embodiments, the system APIs may receive a request from a user to generate a custom report, and may process a response by utilizing input JSON file and automatically generate a custom report based on the desired file format. Utilizing JSON configuration, the platform and database agnostic report generating module may be configured to obtain rich interfaces with more customizations options to generate a desired number of report templates.

According to exemplary embodiments, a method for generating platform and database agnostic reports by utilizing one or more processors along with allocated memory is disclosed. The method may include: receiving a configuration file via a user interface, the configuration file including reporting configurations for components associated with reporting service: interpreting the configuration file by utilizing corresponding interpreter libraries; invoking, in response to interpreting the configuration file, a predefined API: processing, in response to invoking the API, the reporting configurations using the interpreter libraries to process data object references and pre-configured report layout formats; receiving a request from a user to generate a custom report; and automatically rendering, in response to receiving the request, a platform and a database agnostic report by implementing a desired visualization techniques.

According to exemplary embodiments, the configuration file may be an open standard file format and data interchange format that uses human-readable text to store and transmit data objects consisting of attribute.

According to exemplary embodiments, the reporting configurations for components associated with reporting service may include the data object references and the preconfigured report layout formats.

According to exemplary embodiments, the data object references may include APIs, corresponding databases, and corresponding configuration files, but the disclosure is not limited thereto.

According to exemplary embodiments, the preconfigured report layout formats may include cell formats, header formats, footer formats, charts, tables, and sheets associated with the reporting service, but the disclosure is not limited thereto.

According to exemplary embodiments, the platform and the database agnostic report may be automatically generated in a manner such that the generated report may be independently tuned or modified for optimal visualizations and modifications without affecting the configuration file or without depending on types of the database and the platform.

According to exemplary embodiments, the visualization techniques may include targeted output in any format specified in JSON configuration file, for example it can be in .pdf, .doc, .csv, .xlsx, etc., but the disclosure is not limited thereto.

According to exemplary embodiments, a system for generating platform and database agnostic reports is disclosed. The system may include: a processor; and a memory operatively connected to the processor via a communication interface, the memory storing computer readable instructions, when executed, may cause the processor to: receive a configuration file via a user interface, the configuration file including reporting configurations for components associated with reporting service; interpret the configuration file by utilizing corresponding interpreter libraries; invoke, in response to interpreting the configuration file, a predefined API; process, in response to invoking the API, the reporting configurations using the interpreter libraries to process data object references and pre-configured report layout formats; receive a request from a user to generate a custom report; and automatically render, in response to receiving the request, a platform and a database agnostic report by implementing a desired visualization techniques.

According to exemplary embodiments, a non-transitory computer readable medium configured to store instructions for generating platform and database agnostic reports is disclosed. The instructions, when executed, may cause a processor to perform the following: receiving a configuration file via a user interface, the configuration file including reporting configurations for components associated with reporting service; interpreting the configuration file by utilizing corresponding interpreter libraries; invoking, in response to interpreting the configuration file, a predefined API; processing, in response to invoking the API, the reporting configurations using the interpreter libraries to process data object references and pre-configured report layout formats; receiving a request from a user to generate a custom report; and automatically rendering, in response to receiving the request, a platform and a database agnostic report by implementing a desired visualization techniques.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 7 illustrates an exemplary report configuration JSON implemented by the platform and database agnostic report generating module of FIG. 4 for generating platform and database agnostic reports in accordance with an exemplary embodiment.

FIG. 8 illustrates another exemplary report configuration JSON implemented by the platform and database agnostic report generating module of FIG. 4 for generating platform and database agnostic reports in accordance with an exemplary embodiment.

DETAILED DESCRIPTION

Figure 1:
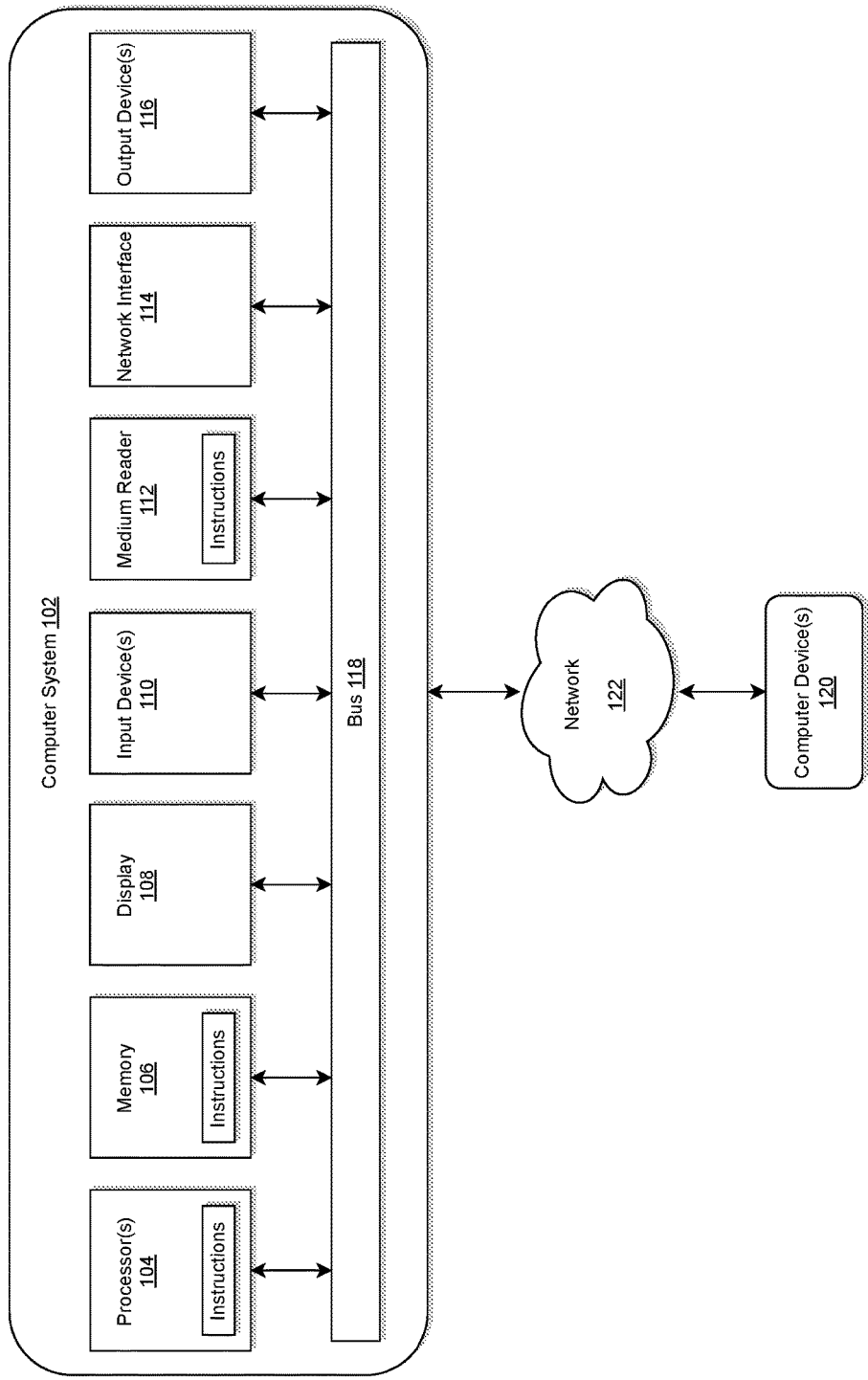
FIG. 1 illustrates a computer system for implementing a platform and database agnostic report generating module configured to generate platform and database agnostic report templates without depending on reporting services in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system 100 for use in implementing a platform and database agnostic report generating module configured to generate platform and database agnostic report templates without depending on reporting services in accordance with an exemplary embodiment. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, a visual positioning system (VPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 104 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

According to exemplary embodiments, the report generating module may be platform and database agnostic that may allow for consistent easy orchestration and passing of data through various components to output a desired result regardless of platform, language, database, and cloud environment. Since the disclosed process, according to exemplary embodiments, is platform, language, database, and cloud agnostic, the report generating module may be independently tuned or modified for optimal performance without affecting the configuration or data files. The configuration or data files, according to exemplary embodiments, may be written using JSON, but the disclosure is not limited thereto. For example, the configuration or data files may easily be extended to other readable file formats such as XML, YAML, etc., or any other configuration based languages.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
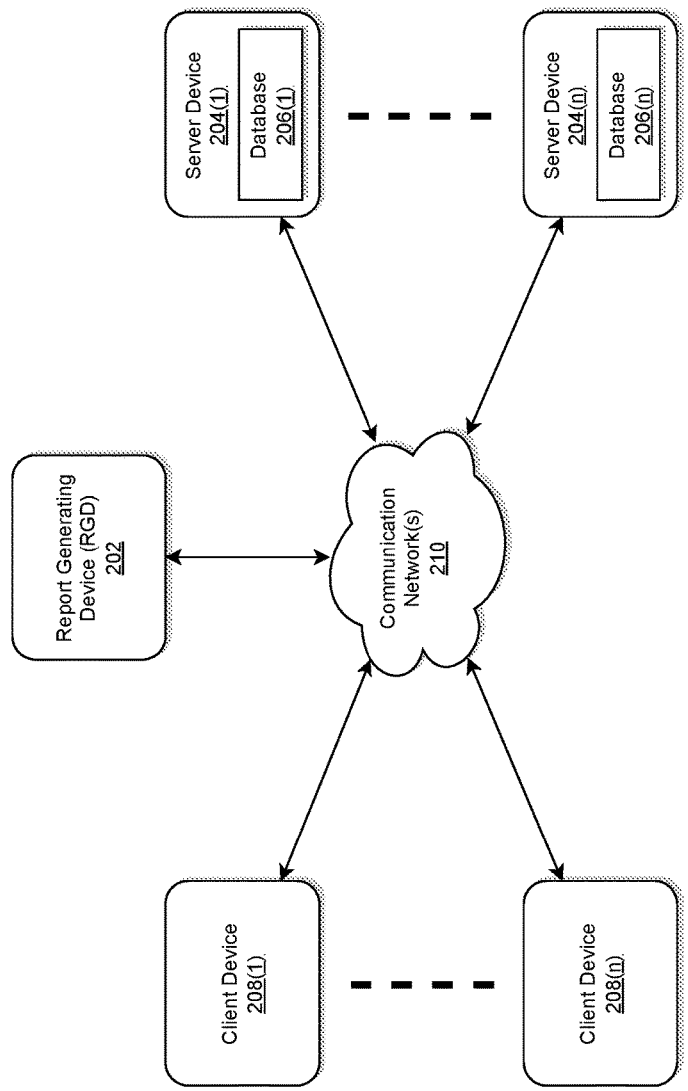
FIG. 2 illustrates an exemplary diagram of a network environment with a platform and database agnostic report generating device in accordance with an exemplary embodiment.

Referring to FIG. 2, a schematic of an exemplary network environment 200 for implementing a language, platform, database, and cloud agnostic report generating device (RGD) of the instant disclosure is illustrated.

According to exemplary embodiments, the above-described problems associated with conventional tools may be overcome by implementing an RGD 202 as illustrated in FIG. 2 that may be configured for implementing a platform and database agnostic report generating module configured to generate platform and database agnostic reports, but the disclosure is not limited thereto. For example, the above-described problems associated with conventional tools may be overcome by implementing the RGD 202 as illustrated in FIG. 2 that may be configured to facilitate configured to facilitate: generation of platform independent library: generation of database agnostic report templates: adding rich customized features for reporting: implementation of lightweight JSON based configuration: generation of a platform that supports all report formats: generation of a platform that supports heterogeneous data sources: generation of a user interface that provides better visualization of data, but the disclosure is not limited thereto.

The RGD 202 may be the same or similar to the computer system 102 as described with respect to FIG. 1.

The RGD 202 may store one or more applications that can include executable instructions that, when executed by the RGD 202, cause the RGD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the RGD 202 itself, may be located in virtual server(s) running in a cloud-based computing environment rather than being tied to one or more specific physical network computing devices. Also, the application(s) may be running in one or more virtual machines (VMs) executing on the RGD 202. Additionally, in one or more embodiments of this technology, virtual machine(s) running on the RGD 202 may be managed or supervised by a hypervisor.

In the network environment 200 of FIG. 2, the RGD 202 is coupled to a plurality of server devices 204(1)-204(n) that hosts a plurality of databases 206(1)-206(n), and also to a plurality of client devices 208(1)-208(n) via communication network(s) 210. A communication interface of the RGD 202, such as the network interface 114 of the computer system 102 of FIG. 1, operatively couples and communicates between the RGD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the RGD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The RGD 202 may be a standalone device or integrated with one or more other devices or apparatuses, such as one or more of the server devices 204(1)-204(n), for example. In one particular example, the RGD 202 may be hosted by one of the server devices 204(1)-204(n), and other arrangements are also possible. Moreover, one or more of the devices of the RGD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the RGD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the RGD 202 that may efficiently provide a platform for implementing a platform and database agnostic report generating module configured to generate platform and database agnostic reports, but the disclosure is not limited thereto. For example, according to exemplary embodiments, the client devices 208(1)-208(n) in this example may include any type of computing device that can facilitate the implementation of the RGD 202 that may efficiently provide a platform for implementing a platform and database agnostic report generating module configured to facilitate configured to facilitate: generation of platform independent library: generation of database agnostic report templates: adding rich customized features for reporting: implementation of lightweight JSON based configuration: generation of a platform that supports all report formats: generation of a platform that supports heterogeneous data sources: generation of a user interface that provides better visualization of data, but the disclosure is not limited thereto.

The client devices 208(1)-208(n) may run interface applications, such as standard web browsers or standalone client applications, which may provide an interface to communicate with the RGD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the RGD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as may be appreciated by those skilled in the relevant art(s).

One or more of the devices depicted in the network environment 200, such as the RGD 202, the server devices 204(1)-204(n), or the client devices 208(1)-208(n), for example, may be configured to operate as virtual instances on the same physical machine. For example, one or more of the RGD 202, the server devices 204(1)-204(n), or the client devices 208(1)-208(n) may operate on the same physical device rather than as separate devices communicating through communication network(s) 210. Additionally, there may be more or fewer RGDs 202, server devices 204(1)-204(n), or client devices 208(1)-208(n) than illustrated in FIG. 2. According to exemplary embodiments, the RGD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
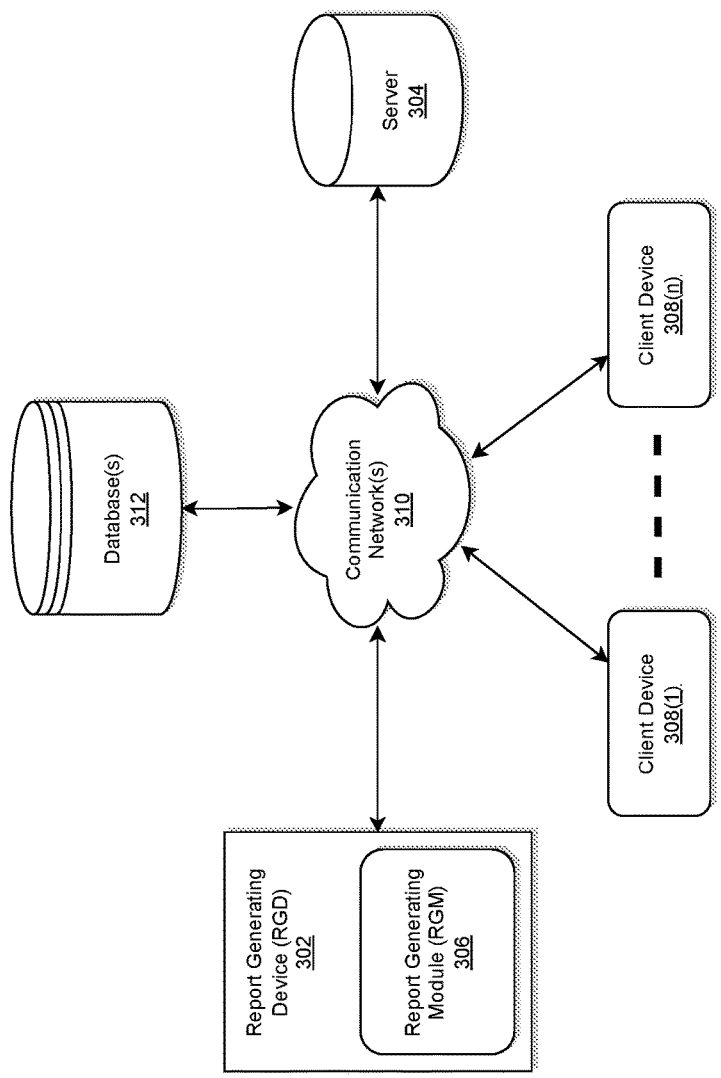
FIG. 3 illustrates a system diagram for implementing a platform and database agnostic report generating device having a platform and database agnostic report generating module in accordance with an exemplary embodiment.

FIG. 3 illustrates a system diagram for implementing a platform, language, and cloud agnostic RGD having a platform and database agnostic report generating module (RGM) in accordance with an exemplary embodiment.

As illustrated in FIG. 3, the system 300 may include a RGD 302 within which an RGM 306 is embedded, a server 304, a database(s) 312, a plurality of client devices 308(1) . . . 308(n), and a communication network 310.

According to exemplary embodiments, the RGD 302 including the RGM 306 may be connected to the server 304, and the database(s) 312 via the communication network 310. The RGD 302 may also be connected to the plurality of client devices 308(1) . . . 308(n) via the communication network 310, but the disclosure is not limited thereto.

According to exemplary embodiment, the RGD 302 is described and shown in FIG. 3 as including the RGM 306, although it may include other rules, policies, modules, databases, or applications, for example. According to exemplary embodiments, the database(s) 312 may be configured to store ready to use modules written for each API for all environments. Although only one database is illustrated in FIG. 3, the disclosure is not limited thereto. Any number of desired databases may be utilized for use in the disclosed invention herein. The database(s) may be a mainframe database, a log database that may produce programming for searching, monitoring, and analyzing machine-generated data via a web interface, etc., but the disclosure is not limited thereto.

According to exemplary embodiments, the RGM 306 may be configured to receive real-time feed of data from the plurality of client devices 308(1) . . . 308(n) and secondary sources via the communication network 310.

As may be described below, the RGM 306 may be configured to: receive a configuration file via a user interface, the configuration file including reporting configurations for components associated with reporting service: interpret the configuration file by utilizing corresponding interpreter libraries: invoke, in response to interpreting the configuration file, a predefined API: process, in response to invoking the API, the reporting configurations using the interpreter libraries to process data object references and pre-configured report layout formats: receive a request from a user to generate a custom report; and automatically render, in response to receiving the request, a platform and a database agnostic report by implementing a desired visualization techniques, but the disclosure is not limited thereto.

The plurality of client devices 308(1) . . . 308(n) are illustrated as being in communication with the RGD 302. In this regard, the plurality of client devices 308(1) . . . 308(n) may be "clients" (e.g., customers) of the RGD 302 and are described herein as such. Nevertheless, it is to be known and understood that the plurality of client devices 308(1) . . . 308(n) need not necessarily be "clients" of the RGD 302, or any entity described in association therewith herein. Any additional or alternative relationship may exist between either or both of the plurality of client devices 308(1) . . . 308(n) and the RGD 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the RGD 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The RGD 302 may be the same or similar to the RGD 202 as described with respect to FIG. 2, including any features or combination of features described with respect thereto.

Figure 4:
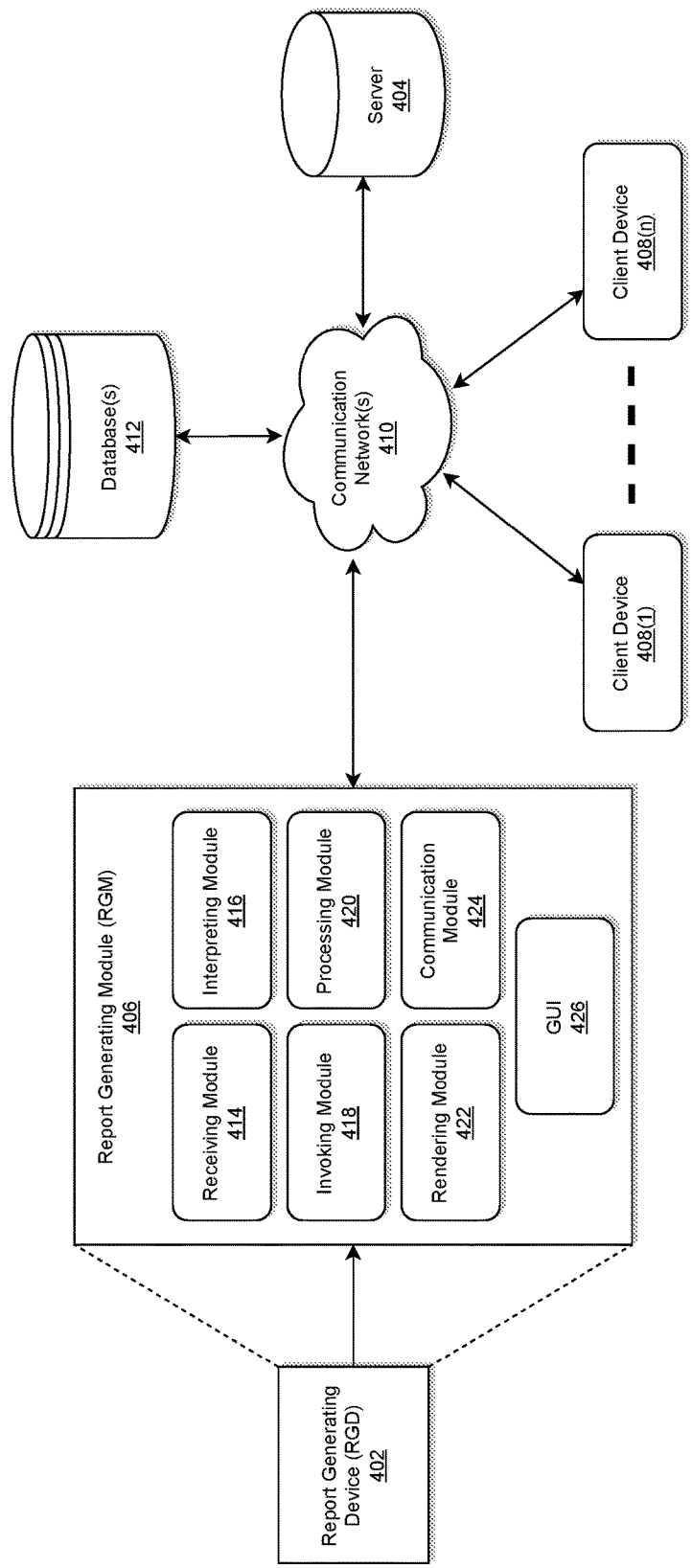
FIG. 4 illustrates a system diagram for implementing a platform and database agnostic report generating module of FIG. 3 in accordance with an exemplary embodiment.

FIG. 4 illustrates a system diagram for implementing a platform and database agnostic RGM of FIG. 3 in accordance with an exemplary embodiment.

According to exemplary embodiments, the system 400 may include a platform and database agnostic RGD 402 within which a platform and database agnostic RGM 406 is embedded, a server 404, database(s) 412, and a communication network 410. According to exemplary embodiments, server 404 may comprise a plurality of servers located centrally or located in different locations, but the disclosure is not limited thereto.

According to exemplary embodiments, the RGD 402 including the RGM 406 may be connected to the server 404 and the database(s) 412 via the communication network 410. The RGD 402 may also be connected to the plurality of client devices 408(1)-408(n) via the communication network 410, but the disclosure is not limited thereto. The RGM 406, the server 404, the plurality of client devices 408(1)-408(n), the database(s) 412, the communication network 410 as illustrated in FIG. 4 may be the same or similar to the RGM 306, the server 304, the plurality of client devices 308(1)-308(n), the database(s) 312, the communication network 310, respectively, as illustrated in FIG. 3.

According to exemplary embodiments, as illustrated in FIG. 4, the RGM 406 may include a receiving module 414, an interpreting module 416, an invoking module 418, a processing module 420, a rendering module 422, a communication module 424, and a GUI 426. According to exemplary embodiments, interactions and data exchange among these modules included in the RGM 406 provide the advantageous effects of the disclosed invention. Functionalities of each module of FIG. 4 may be described in detail below with reference to FIGS. 4-6.

According to exemplary embodiments, each of the receiving module 414, the interpreting module 416, the invoking module 418, the processing module 420, the rendering module 422, and the communication module 424 of the RGM 406 of FIG. 4 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

According to exemplary embodiments, each of the receiving module 414, the interpreting module 416, the invoking module 418, the processing module 420, the rendering module 422, and the communication module 424 of the RGM 406 of FIG. 4 may be implemented by microprocessors or similar, and may be programmed using software (e.g., microcode) to perform various functions discussed herein and may optionally be driven by firmware and/or software.

Alternatively, according to exemplary embodiments, each of the receiving module 414, the interpreting module 416, the invoking module 418, the processing module 420, the rendering module 422, and the communication module 424 of the RGM 406 of FIG. 4 may be implemented by dedicated hardware, or as a combination of dedicated hardware to perform some functions and a processor (e.g., one or more programmed microprocessors and associated circuitry) to perform other functions.

According to exemplary embodiments, the receiving module 414 may have an API for receiving JSON configuration file and then each of the other modules including the interpreting module 416, invoking module 418, rendering module 422 and the communication module 424 may be orchestrated by one after another.

According to exemplary embodiments, the process implemented by the RGM 406 may be executed via the communication module 424 and the communication network 410, which may comprise plural networks as described above. For example, in an exemplary embodiment, the various components of the RGM 406 may communicate with the server 404, and the database(s) 412 via the communication module 424 and the communication network 410. Of course, these embodiments are merely exemplary and are not limiting or exhaustive. The database(s) 412 may include the databases included within the private cloud and/or public cloud and the server 404 may include one or more servers within the private cloud and the public cloud.

Figure 5:
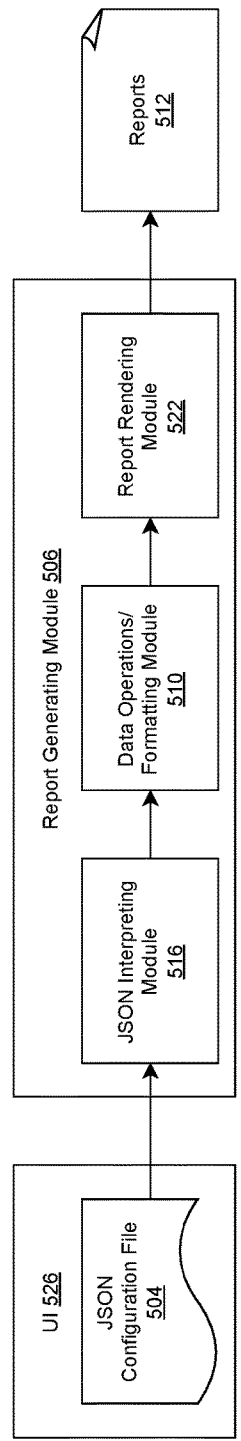
FIG. 5 illustrates an exemplary flow diagram of JSON configuration based reporting as implemented by the platform and database agnostic report generating module of FIG. 4 in accordance with an exemplary embodiment.

For example, FIG. 5 illustrates an exemplary flow diagram 500 of JSON configuration based reporting as implemented by the platform and database agnostic RGM 406 of FIG. 4 in accordance with an exemplary embodiment. As illustrated in FIG. 5, the flow diagram 500 may include a report generating module (RGM) 506 operatively connected to a UI 526. The RGM 506 may be the same or similar to the RGM 406 as illustrated in FIG. 4. For example, the RGM 506 may include a JSON interpreting module, a data operations/formatting module 510, and a report rendering module 522. According to exemplary embodiments, the JSON interpreting module 516 may be the same or similar to the interpreting module 416, and the report rendering module 522 may be same or similar to the rendering module 422 as illustrated in FIG. 4.

As illustrated in FIG. 5, the JSON interpreting module 516 may receive the JSON configuration file 504 from the UI 526. The JSON interpreting module 516 may interpret the received JSON configuration file and output data to the data operations/formatting module 510. The data operations/formatting module 510 may implement processing to format the interpreted data received from the JSON interpreting module 516. For example, the RGM 506 may be configured in a such manner where system APIs are exposed which accepts the JSON configuration file 504 containing reporting configurations such as data query reference, cell formatting, report layouts, etc., but the disclosure is not limited thereto. The RGM 506 may also be configured to process JSON configurations using PySpark (Python) library and render a report 512 using open source Python libraries for output rendering, i.e., Xlsx Writer by utilizing the report rendering module 522. The system APIs receive a request from a user to generate a custom report (i.e., report 512). A response may be processed by utilizing the input JSON configuration file 504 and automatically generate a custom report based on a desired file format by utilizing the report rendering module 522.

Figure 6:
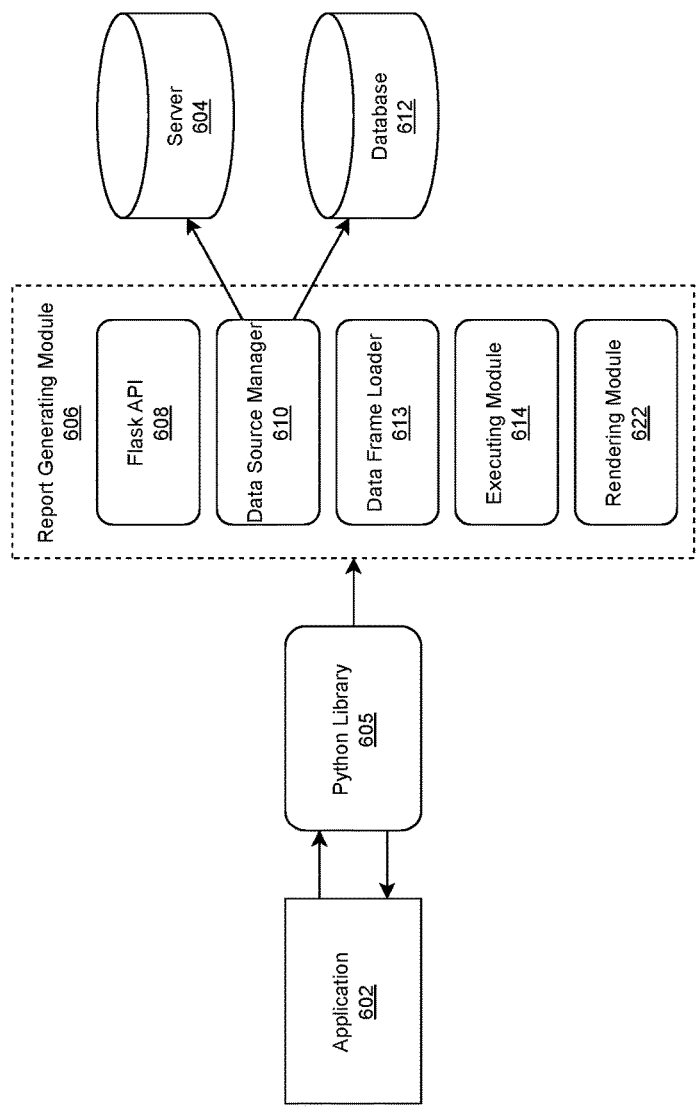
FIG. 6 illustrates an exemplary architecture implemented by the platform and database agnostic report generating module of FIG. 4 for rendering platform and database agnostic reports in accordance with an exemplary embodiment.

For example, FIG. 6 illustrates an exemplary architecture 600 implemented by the platform and database agnostic RGM 406 of FIG. 4 or the RGM 506 of FIG. 5 for rendering platform and database agnostic reports in accordance with an exemplary embodiment.

As illustrated in FIG. 6, the exemplary architecture 600 may include an application 602 (i.e., business application for report configuration JSON file 504 as illustrated in FIG. 5) operatively connected to a Python library 605 (i.e., Application Microservice) and a report generating module (RGM) 606. According to exemplary embodiments, the RGM 606 may be the same or similar to the RGM 406 as illustrated in FIG. 4 and/or the same or similar to the RGM 506 as illustrated in FIG. 5. According to exemplary embodiments, installation of the exemplary architecture may implement Python through Dev Shell; Miniconda through Dev Shell; Hadoop; Spark; Pandas; and IntelliJ (IDE for development), but the disclosure is not limited thereto.

For example, the RGM 606 may include a Flask API 608, a data source manager 610, a data frame loader 613, an executing module 614, and a rendering module. The data source manager may be operatively connected to a server 604 (i.e., an SQL server) and a database 612 (i.e., Aurora DB). According to exemplary embodiments, the RGM 606 may receive the application 602 (report configuration JSON) via the Python library 605. The Flask API 608 may be exposed which accepts the application 602 (report configuration JSON) containing reporting configurations such as data query reference, cell formatting, report layouts, etc., but the disclosure is not limited thereto. In response to the Flask API 608 exposure, the data source manager 610 may communicate with the server 604 and the database 612 to receive corresponding data for report generation. The data frame loader 613 may receive the data from the data source manager 610 and may create a session to load the data frame. According to exemplary embodiments, the session may include Spark session object as a primary entry point for Spark applications, which allows running SQL queries on database tables. The executing module 614 may execute the data received from the data frame loader 613 and outputs the data to the rendering module 622. For example, the executing module 614 runs expressions using the Spark session. The rendering module 622 then automatically renders reports based on the data received from the executing module 614. According to exemplary embodiments, the rendering module 622 may utilize open source python libraries for output rendering, i.e., XLsxWriter for excel rendering, but the disclosure is not limited thereto.

Referring back to FIGS. 4-6, the present disclosure, through one or more of its various aspects, embodiments, and/or specific features or sub-components, provides, among other features, various systems, servers, devices, methods, media, programs, and platforms for implementing a platform and database agnostic RGM 406, 506, 606 configured to develop a system and implement a method where corresponding application programming interfaces (APIs) are exposed which accepts JSON file containing reporting configurations such as data object reference (i.e., API or database or file, etc., but the disclosure is not limited thereto), report layout formatting (i.e., formatting cell or header or footer or charts or tables or sheets, etc., but the disclosure is not limited thereto).

For example, according to exemplary embodiments, receiving module 414 may be configured to receive a configuration file (i.e., JSON configuration file 504) via a user interface 526 as illustrated in FIG. 5, the configuration file (i.e., JSON configuration file 504) including reporting configurations for components associated with reporting service. The interpreting module 416 (or the JSON interpreting module 516) may be configured to interpret the configuration file (i.e., JSON configuration file 504) by utilizing corresponding interpreter libraries (i.e., Python library 605). The invoking module 418 may be configured to invoke, in response to interpreting the configuration file (i.e., JSON configuration file 504), a predefined API (i.e., Flask API 608). The processing module 420 may be configured to process, in response to invoking the API (i.e., Flask API 608), the reporting configurations using the interpreter libraries (i.e., Python library 605) to process data object references and pre-configured report layout formats. The receiving module 414 may be further configured to receive a request from a user to generate a custom report. The rendering module 422 may be configured to automatically render, in response to receiving the request, a platform and a database agnostic report by implementing a desired visualization techniques.

For example, according to exemplary embodiments, the system and method implemented by the RGM 406, 506, 606 may process JSON configurations using interpreter libraries (i.e., Python library 605) to process data objects and report formatting by utilizing the data operations/formatting module 510 as illustrated in FIG. 5 and then render reports using visualization techniques by the rendering module 422, 622 (or the report rendering module 522). And then display the report (i.e., reports 512 as illustrated in FIG. 5) onto the GUI 426 as illustrated in FIG. 4.

According to exemplary embodiments, the system APIs may receive a request from a user to generate a custom report, and may process a response by utilizing input JSON file and automatically generate a custom report based on the desired file format. Utilizing JSON configuration, the platform and database agnostic report generating module may be configured to obtain rich interfaces with more customizations options to generate a desired number of report templates.

According to exemplary embodiments, the configuration file may be an open standard file format and data interchange format that uses human-readable text to store and transmit data objects consisting of attribute.

According to exemplary embodiments, the reporting configurations for components associated with reporting service may include the data object references and the preconfigured report layout formats.

According to exemplary embodiments, the data object references may include APIs, corresponding databases, and corresponding configuration files, but the disclosure is not limited thereto.

According to exemplary embodiments, the preconfigured report layout formats may include cell formats, header formats, footer formats, charts, tables, and sheets associated with the reporting service, but the disclosure is not limited thereto.

According to exemplary embodiments, the platform and the database agnostic report may be automatically generated in a manner such that the generated report may be independently tuned or modified for optimal visualizations and modifications without affecting the configuration file or without depending on types of the database and the platform.

According to exemplary embodiments, the pre-desired visualization techniques may include targeted output in any format specified in JSON configuration file, for example, it can be in .pdf, .doc, .csv, .xlsx, etc., but the disclosure is not limited thereto.

According to exemplary embodiments, instead of Python, other preconfigured language may be utilized such as C#, or Java, or C++, but the disclosure is not limited thereto.

FIG. 7 illustrates an exemplary report configuration JSON 700 implemented by the platform and database agnostic RGM 406, 506, 606 for generating platform and database agnostic reports in accordance with an exemplary embodiment. As illustrated in FIG. 7, the report configuration JSON 700 may include data sources that may include ID, name, descriptions, connection (i.e., type, server, database, etc.). The report configuration JSON 700 may also include data sets that may include name, query (i.e., data source name, query parameters, command type, command text, etc.), and fields (i.e., name, metadata, nullable, type, etc.).

FIG. 8 illustrates another exemplary report configuration JSON 800 implemented by the platform and database agnostic RGM 406, 506, 606 for generating platform and database agnostic reports in accordance with an exemplary embodiment. As illustrated in FIG. 8, the reports may include report sections that includes body. The body may include worksheets. According to exemplary embodiments, the worksheets may include name, report items (i.e., textbox including row index, column index, value, style (i.e., bold, color, size, etc.), table (i.e., row index, column index, header row, etc.). The header row may include header style (i.e., font name, bold, font color, font size, etc.) and columns (i.e., value, style (i.e., bold, color, size, etc.)).

Figure 9:
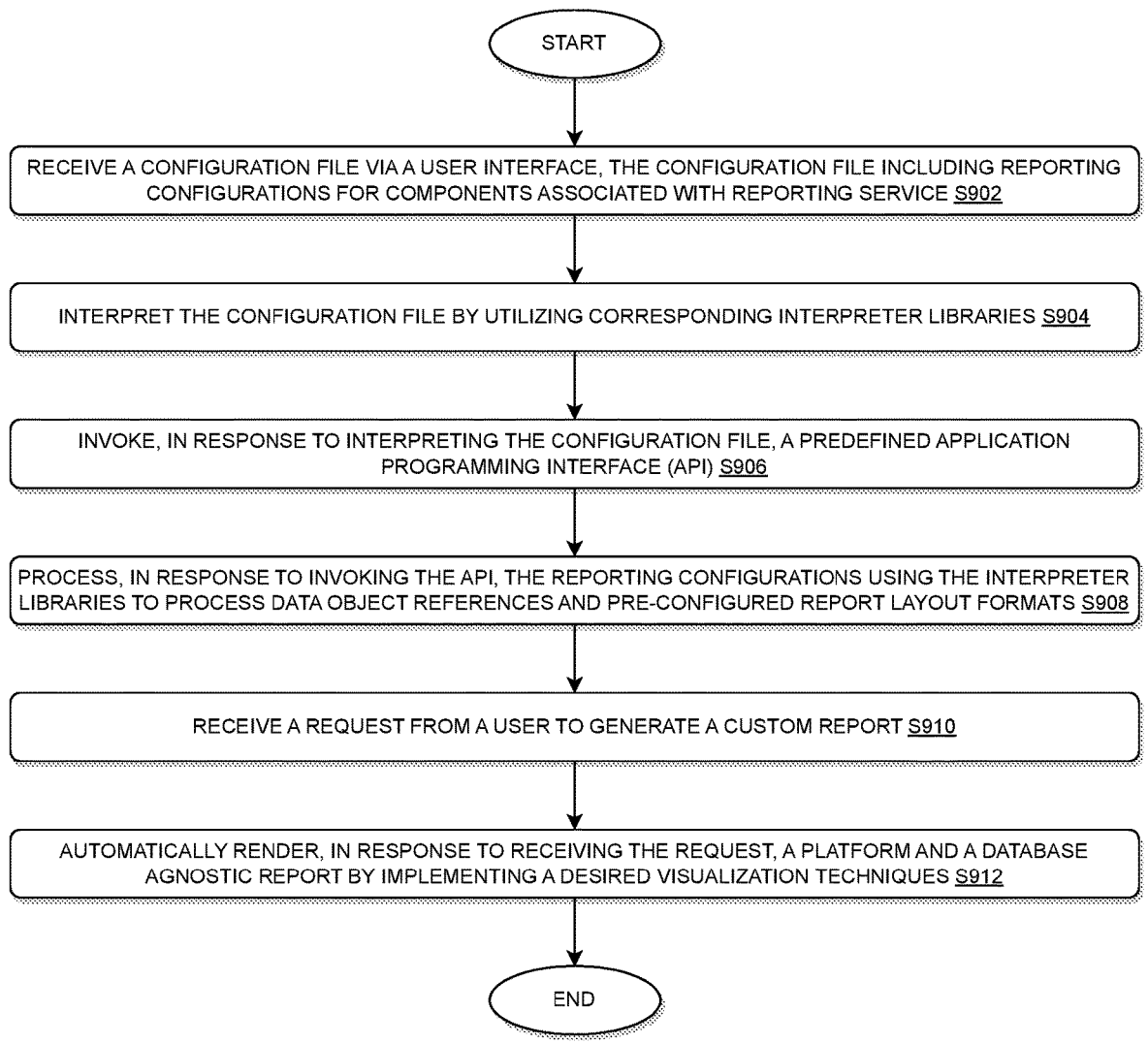
FIG. 9 illustrates an exemplary flow chart of a process implemented by the platform and database agnostic report generating module of FIG. 4 for generating platform and database agnostic report templates without depending on reporting services in accordance with an exemplary embodiment.

FIG. 9 illustrates an exemplary flow chart of a process 900 implemented by the platform and database agnostic RGM 406 of FIG. 4 (or RGM 506 of FIG. 5, or RGM 506 of FIG. 6)) for generating platform and database agnostic reports (i.e., report templates) without depending on reporting services in accordance with an exemplary embodiment. It may be appreciated that the illustrated process 900 and associated steps may be performed in a different order, with illustrated steps omitted, with additional steps added, or with a combination of reordered, combined, omitted, or additional steps.

As illustrated in FIG. 9, at step S902, the process 900 may include receiving a configuration file via a user interface, the configuration file including reporting configurations for components associated with reporting service.

At step S904, the process 900 may include interpreting the configuration file by utilizing corresponding interpreter libraries.

At step S906, the process 900 may include invoking, in response to interpreting the configuration file, a predefined API.

At step S908, the process 900 may include processing, in response to invoking the API, the reporting configurations using the interpreter libraries to process data object references and pre-configured report layout formats.

At step S910, the process 900 may include receiving a request from a user to generate a custom report.

At step S912, the process 900 may include automatically rendering, in response to receiving the request, a platform and a database agnostic report by implementing a desired visualization techniques.

According to exemplary embodiments, in the process 900, the configuration file may be an open standard file format and data interchange format that uses human-readable text to store and transmit data objects consisting of attribute.

According to exemplary embodiments, in the process 900, the reporting configurations for components associated with reporting service may include the data object references and the preconfigured report layout formats.

According to exemplary embodiments, in the process 900, the data object references may include APIs, corresponding databases, and corresponding configuration files, but the disclosure is not limited thereto.

According to exemplary embodiments, in the process 900, the preconfigured report layout formats may include cell formats, header formats, footer formats, charts, tables, and sheets associated with the reporting service, but the disclosure is not limited thereto.

According to exemplary embodiments, in the process 900, the platform and the database agnostic report may be automatically generated in a manner such that the generated report may be independently tuned or modified for optimal visualizations and modifications without affecting the configuration file or without depending on types of the database and the platform.

According to exemplary embodiments, in the process 900, the pre-desired visualization techniques may include targeted output in any format specified in JSON configuration file, for example, it can be in .pdf, .doc, .csv, .xlsx, etc., but the disclosure is not limited thereto.

According to exemplary embodiments, the RGD 402 may include a memory (e.g., a memory 106 as illustrated in FIG. 1) which may be a non-transitory computer readable medium that may be configured to store instructions for implementing a platform and database agnostic RGM 406, 506 for generating platform and database agnostic reports as disclosed herein. The RGD 402 may also include a medium reader (e.g., a medium reader 112 as illustrated in FIG. 1) which may be configured to read any one or more sets of instructions, e.g., software, from any of the memories described herein. The instructions, when executed by a processor embedded within the RGM 406, 506, or within the RGD 402, may be used to perform one or more of the methods and processes as described herein. In a particular embodiment, the instructions may reside completely, or at least partially, within the memory 106, the medium reader 112, and/or the processor 104 (see FIG. 1) during execution by the RGD 402.

According to exemplary embodiments, the instructions, when executed, may cause a processor embedded within the RGM 406, 506, 606 or the RGD 402 to perform the following: receiving a configuration file via a user interface, the configuration file including reporting configurations for components associated with reporting service: interpreting the configuration file by utilizing corresponding interpreter libraries: invoking, in response to interpreting the configuration file, a predefined API: processing, in response to invoking the API, the reporting configurations using the interpreter libraries to process data object references and pre-configured report layout formats: receiving a request from a user to generate a custom report; and automatically rendering, in response to receiving the request, a platform and a database agnostic report by implementing a desired visualization techniques. According to exemplary embodiments, the processor may be the same or similar to the processor 104 as illustrated in FIG. 1 or the processor embedded within RGD 202, RGD 302, RGD 402, and RGM 406, 506.

According to exemplary embodiments as disclosed above in FIGS. 1-9, technical improvements effected by the instant disclosure may include a platform for implementing a platform and database agnostic report generating module configured to generate platform and database agnostic reports templates without depending on reporting services, but the disclosure is not limited thereto. According to exemplary embodiments as disclosed above in FIGS. 1-9, technical improvements effected by the instant disclosure may include a platform for implementing a platform and database agnostic report generating module configured to facilitate: generation of platform independent library: generation of database agnostic report templates: adding rich customized features for reporting: implementation of lightweight JSON based configuration: generation of a platform that supports all report formats: generation of a platform that supports heterogeneous data sources; and generation of a user interface that provides better visualization of data, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed: rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for generating platform and database agnostic reports by utilizing one or more processors along with allocated memory, the method comprising:
   receiving a configuration file via a user interface, the configuration file including reporting configurations for components associated with reporting service;
   interpreting the configuration file by utilizing corresponding interpreter libraries;
   invoking, in response to interpreting the configuration file, a predefined application programming interface (API);
   processing, in response to invoking the API, the reporting configurations using the interpreter libraries to process data object references and pre-configured report layout formats;
   receiving a request from a user to generate a custom report; and
   automatically rendering, in response to receiving the request, a platform and a database agnostic report by implementing a desired visualization techniques,
   wherein the platform and the database agnostic report is automatically generated in a manner such that the generated report is independently tuned or modified for optimal visualizations and modifications without affecting the configuration file or without depending on types of the database and the platform.

2. The method according to claim 1, wherein the configuration file is an open standard file format and data interchange format that uses human-readable text to store and transmit data objects consisting of attribute.

3. The method according to claim 1, wherein the reporting configurations for components associated with reporting service includes the data object references and the preconfigured report layout formats.

4. The method according to claim 3, wherein the data object references include APIs, corresponding databases, and corresponding configuration files.

5. The method according to claim 3, wherein the preconfigured report layout formats include cell formats, header formats, footer formats, charts, tables, and sheets associated with the reporting service.

6. The method according to claim 1, wherein the predesired visualization techniques include targeted output in any format specified in JSON configuration file including one or more of the following formats: .pdf, .doc, .csv, and .xlsx.

7. A system for generating platform and database agnostic reports, the system comprising:
    a processor; and
    a memory operatively connected to the processor via a communication interface, the memory storing computer readable instructions, when executed, causes the processor to:
    receive a configuration file via a user interface, the configuration file including reporting configurations for components associated with reporting service;
    interpret the configuration file by utilizing corresponding interpreter libraries;
    invoke, in response to interpreting the configuration file, a predefined application programming interface (API);
    process, in response to invoking the API, the reporting configurations using the interpreter libraries to process data object references and pre-configured report layout formats;
    receive a request from a user to generate a custom report; and
    automatically render, in response to receiving the request, a platform and a database agnostic report by implementing a desired visualization techniques,
    wherein the platform and the database agnostic report is automatically generated in a manner such that the generated report is independently tuned or modified for optimal visualizations and modifications without affecting the configuration file or without depending on types of the database and the platform.

8. The system according to claim 7, wherein the configuration file is an open standard file format and data interchange format that uses human-readable text to store and transmit data objects consisting of attribute.

9. The system according to claim 7, wherein the reporting configurations for components associated with reporting service includes the data object references and the preconfigured report layout formats.

10. The system according to claim 9, wherein the data object references include APIs, corresponding databases, and corresponding configuration files.

11. The system according to claim 9, wherein the preconfigured report layout formats include cell formats, header formats, footer formats, charts, tables, and sheets associated with the reporting service.

12. The system according to claim 7, wherein the predesired visualization techniques include targeted output in any format specified in JSON configuration file including one or more of the following formats: .pdf, .doc, .csv, and .xlsx.

13. A non-transitory computer readable medium configured to store instructions for generating platform and database agnostic reports, the instructions, when executed, cause a processor to perform the following:
    receiving a configuration file via a user interface, the configuration file including reporting configurations for components associated with reporting service;
    interpreting the configuration file by utilizing corresponding interpreter libraries;
    invoking, in response to interpreting the configuration file, a predefined application programming interface (API);
    processing, in response to invoking the API, the reporting configurations using the interpreter libraries to process data object references and pre-configured report layout formats;
    receiving a request from a user to generate a custom report; and
    automatically rendering, in response to receiving the request, a platform and a database agnostic report by implementing a desired visualization techniques,
    wherein the platform and the database agnostic report is automatically generated in a manner such that the generated report is independently tuned or modified for optimal visualizations and modifications without affecting the configuration file or without depending on types of the database and the platform.

14. The non-transitory computer readable medium according to claim 13, wherein the configuration file is an open standard file format and data interchange format that uses human-readable text to store and transmit data objects consisting of attribute.

15. The non-transitory computer readable medium according to claim 13, wherein the reporting configurations for components associated with reporting service includes the data object references and the preconfigured report layout formats.

16. The non-transitory computer readable medium according to claim 15, wherein the data object references include APIs, corresponding databases, and corresponding configuration files.

17. The non-transitory computer readable medium according to claim 15, wherein the preconfigured report layout formats include cell formats, header formats, footer formats, charts, tables, and sheets associated with the reporting service.

* * * * *